Aug. 30, 1960 F. C. WILLIAMS 2,951,176

APPARATUS FOR STORING TRAINS OF PULSES

Filed Dec. 10, 1947 3 Sheets-Sheet 1

FREDERIC CALLAND WILLIAMS
*Inventor*

By [signature]
*Attorney*

Aug. 30, 1960 F. C. WILLIAMS 2,951,176

APPARATUS FOR STORING TRAINS OF PULSES

Filed Dec. 10, 1947 3 Sheets-Sheet 2

FREDERIC CALLAND WILLIAMS
*Inventor*

By [signature]
*Attorney*

APPARATUS FOR STORING TRAINS OF PULSES

Filed Dec. 10, 1947

FREDERIC GALLAND WILLIAMS
Inventor

By
Attorney

United States Patent Office 2,951,176 Patented Aug. 30, 1960

2,951,176

APPARATUS FOR STORING TRAINS OF PULSES

Frederic Calland Williams, Timperley, England, assignor, by mesne assignments, to International Business Machines Corporation, New York, N.Y., a corporation of New York Filed Dec. 10, 1947, Ser. No. 790,879

Claims priority, application Great Britain Dec. 11, 1946

22 Claims. (Cl. 315—12)

Figure 1:
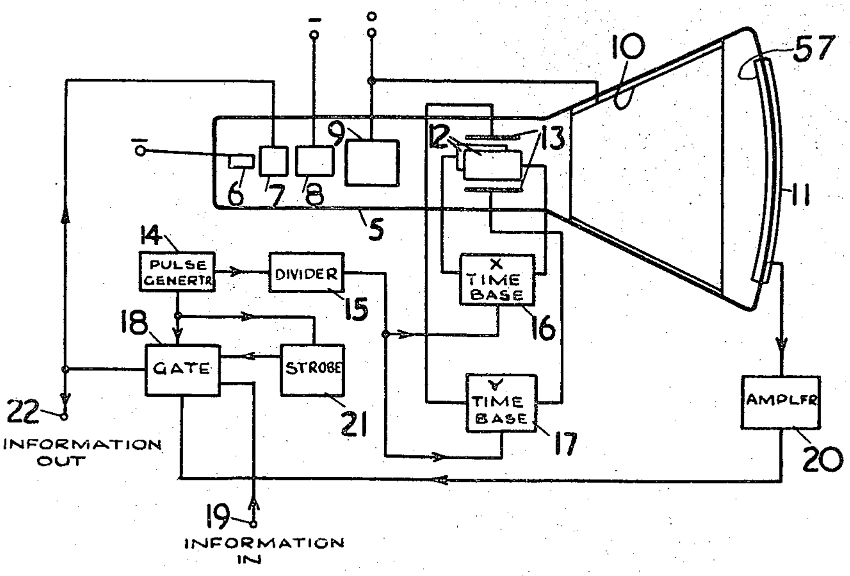

The present invention relates to methods of electrical storage and to electrical storage apparatus in which data in an electrical form are converted into a charge pattern on an insulating surface by bombarding the surface with a cathode ray beam, the original electrical signals being recovered from the record by a reading operation which also involves the use of a cathode ray beam.

The invention is concerned with the fact that no insulating surface which will accept such a charge pattern will retain it indefinitely. Not only does leakage of charge over the surface limit the storage time, but the record may be wholly or partly erased each time the record is read.

One object of this invention is accordingly to provide means for reading a record in the form of a charge pattern on an insulating surface without erasing it. Another object is to provide means for extending the life of the record by regenerating it during reading operations spaced by intervals which are short compared with the leakage time. Still another object is to provide a method of storing information in the form of charges and subsequently regenerating the stored information.

It can be arranged that the time for which information is available is longer than the leakage time by reading the record during its life, and using the reconstituted signals to give rise to a new record on a second insulating surface: the second record may then be read in its turn, and caused to give rise to a third record. If the reading process is one which sweeps the surface clean, the third record may be made on the original insulating surface, the record being shuttled between two insulating surfaces, and being always available on one of them. Because a large part of the equipment is duplicated, such an arrangement has many disadvantages. Moreover, there is difficulty in performing, at any time other than that determined by the normal sequence, the operations of writing new information into the record and reading an element of information from the record.

A further object of the invention is therefore to provide means whereby a charge pattern may be regenerated upon the same surface thus avoiding the need for an intermediate record. Evidently, the invention offers the advantage of simplicity, in that only one recording surface is involved. Another advantage arises as follows: if a record is made and subsequently read without intermediate regeneration there is a danger that a part of the record other than that intended may be read, due to intervening changes in operating conditions producing changes in the instantaneous positions of the cathode ray beam. By the use of the present invention, however, at each regeneration, the record is effectively re-formed under conditions which are very closely similar to those which obtained when the original record was made, but which need not be exactly the same; that is to say, the physical location of the record on the insulating surface in successive regenerations may be subject to a slow wander as the operating conditions undergo the slow changes which are unavoidable in practice, but such a slow wander does not make for difficulty in reading, provided the record is read and regenerated at a rate which is high compared with the rate of variation of operating conditions. Clearly, if a record is made and subsequently read without intermediate regeneration, there is a danger that a part of the record other than that intended may be read, due to intervening changes in operating conditions.

According to the invention, electrical information-storing means comprise an insulating, recording surface contained in an evacuated envelope with means for producing a cathode-ray beam at a velocity such that, when the beam strikes the surface, the number of secondary electrons liberated is greater than the number of primary electrons arriving, means for causing the beam to explore the surface, modulating means for causing the beam to give rise to a charge pattern on the surface corresponding to modulations characteristics of information to be recorded, signal pick-up means associated with the surface, means for extracting from the pick-up means the initial transient of the signal arising in the subsequent exploration of each element of the charge pattern due to a modulation, and means for causing the extracted transients to operate said modulating means to regenerate the charge pattern.

The nature of an element of the charge pattern depends on the information to be recorded. In the application of the invention to the storage of binary principles (numbers in the scale of two, in which only the digits 0 and 1 are employed) the charge distributions representing 0 and 1 are made different, and each is an element of the whole pattern. Conveniently, either digit is associated with a characteristic modulation, and the occurrence of the other is represented by the absence of modulation. As has been explained, the physical location of the record on the surface may be subject to a slow wander due to changes in operating conditions, and thus an element of the charge pattern is not fixedly associated with any particular area of the surface.

The invention is based on the fact that when a cathode ray beam explores an insulating surface under conditions such that the ratio of secondary electrons liberated to primary electrons arriving is greater than unity, and when the beam is modulated so as to give rise to a charge pattern characteristic of the modulation, the signals set up in pick-up means associated with the surface during a subsequent, similar exploration of the charge pattern by the beam contain portions which were not present in the modulation, and which anticipate those parts of the reconstituted signals which mark the occurrence, during the original exploration, of a modulation. That is to say, in the subsequent exploration, advance notice appears in the signals in the pickup means of the modulations which must be effected during the subsequent exploration in order to regenerate the charge pattern. Thus in the subsequent exploration, the record is read, and anticipatory initial transients in the reconstituted signals are extracted and caused to operate the modulating means to regenerate the charge pattern.

The way in which the anticipatory transients, arise is fully explained below; here it may be said, briefly, that they are due to the fact that secondary electrons liberated whilst the beam illuminates one spot on the surface contribute to the charge left on the adjacent spot illuminated during the previous instant, and when the adjacent spot is next explored, a signal arises which takes account of the secondary electrons referred to: but if the exploring beam illuminates a spot on the surface and is then extinguished, the signal arising when that spot is next explored will be of a different nature, for the next spot in the exploratory sequence was not illuminated, and hence did not contribute secondary electrons to the earlier one.

The invention is of particular (but not exclusive) application to storage in digital computors and like machines, and provides means for storing numbers, operations, routing instructions and so on in such machines. Other features of the invention will appear hereinafter.

Reference is now directed to the accompanying drawings, in which

Figure 2:
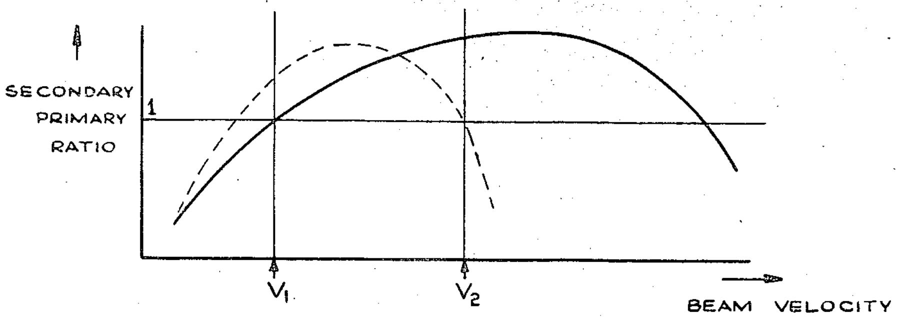
Figure 3:
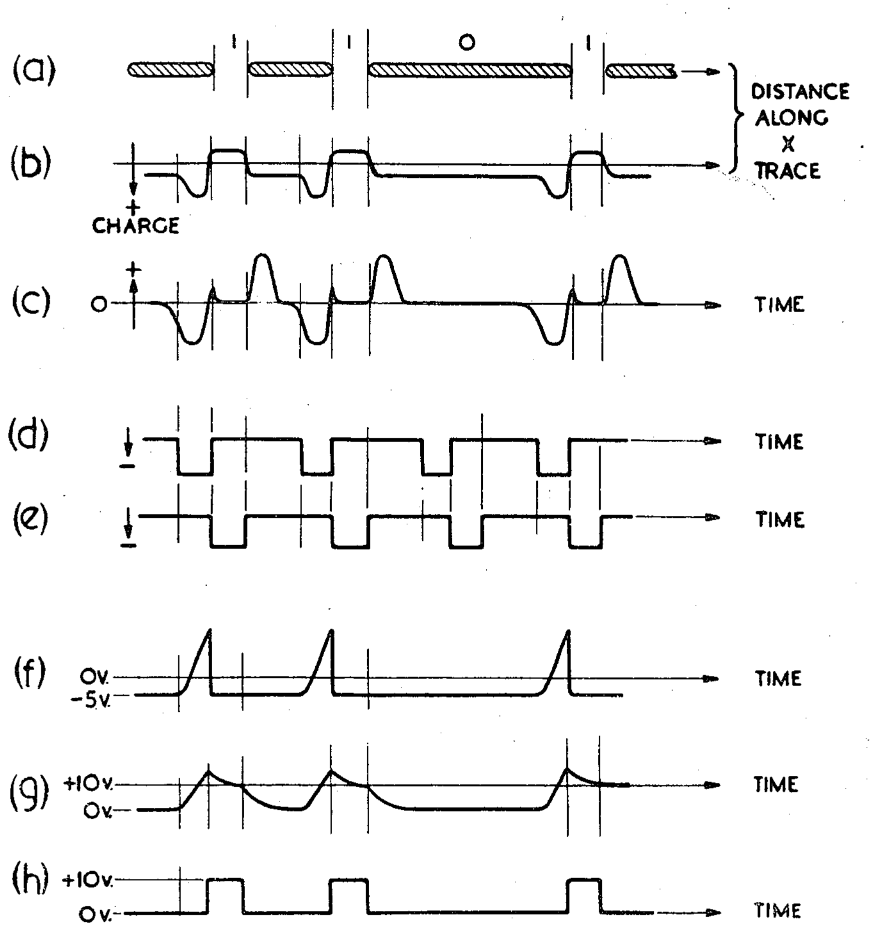
Figure 4:
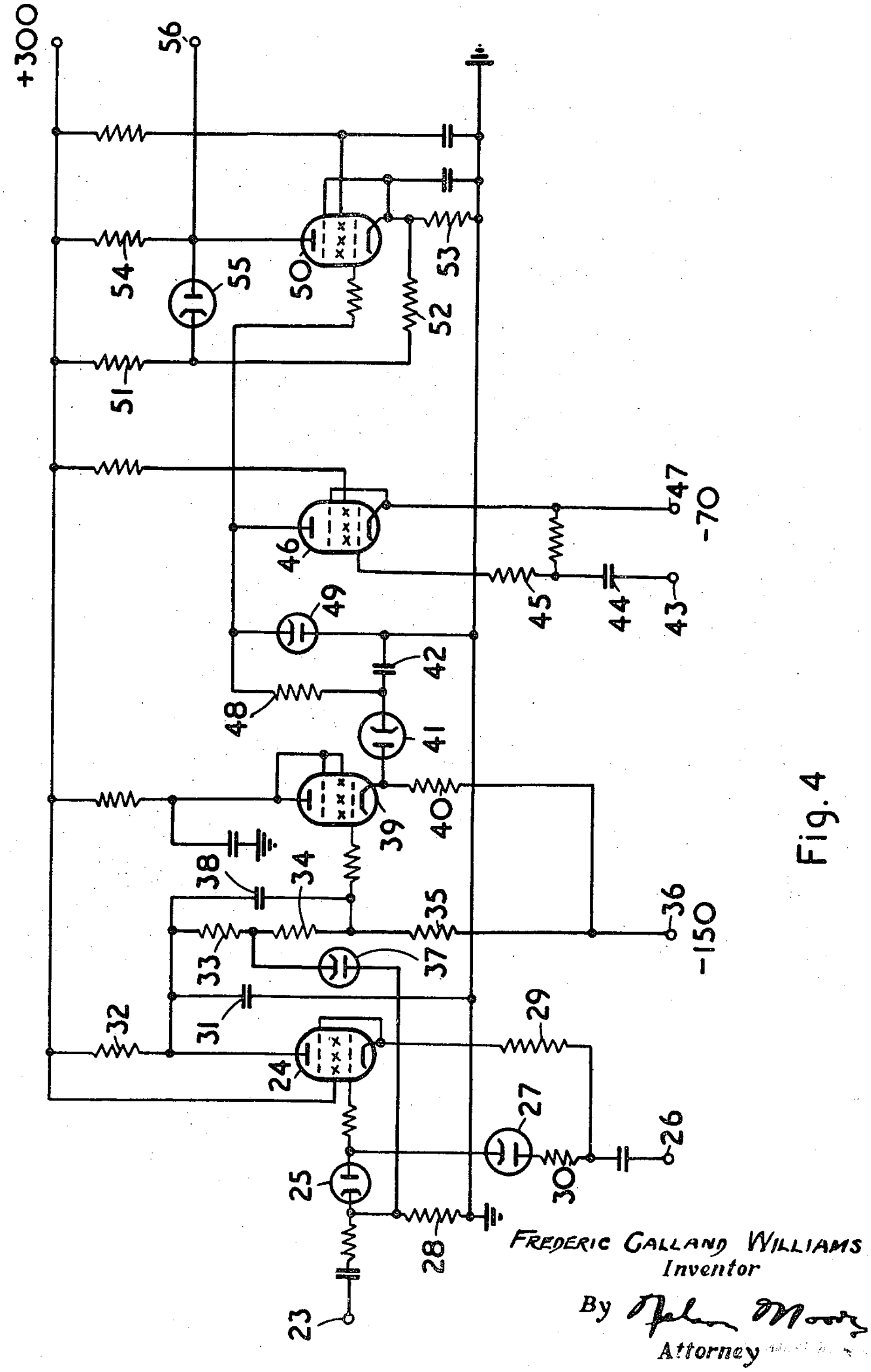

Fig. 1 shows schematically, by way of example, one form of information-storing means according to the invention, Fig. 2 illustrates the operating conditions of the arrangement of Fig. 1, Fig. 3(*a*) to (*h*) are diagrams illustrating the regeneration of the charge pattern, and Fig. 4 is a circuit diagram of a form of gate circuit employed in the arrangement of Fig. 1.

Referring to Fig. 1, the charge pattern is set up on the phosphor screen 57 on the end wall of a cathode ray tube 5. This screen forms an insulating recording surface. The tube has a cathode 6, a modulator grid or anode 7, first and second anodes 8 and 9, a third anode 10 constituted by a conducting coating on the inside wall of the tube, and a signal pick-up plate 11 in the form of a conducting coating on the outside wall of the tube adjacent the phosphor. Two pairs of conjugate deflecting plates 12, 13 are provided to deflect the beam in two coordinate directions. The second and third anodes are held at earth potential, the remaining electrodes having suitable negative potential.

A generator 14 of rectangular pulses (which will be referred to as the "clock" pulses) produces regularly recurring pulses, at a frequency of about 84,000 per second, as shown in Fig. 3(*e*). The duration of each pulse is about 3.5 microseconds, and the intervals between pulses is about 8.5 microseconds. Pulses from generator 14 are fed to a divider 15 which produces pulses corresponding to every 36th input pulse, and the output of divider 15 locks a saw-tooth X time-base generator 16 whose output is applied to the X plates 12 of the tube 5. The forward sweep-to-flyback ratio of the X time-base is 8:1, and the beam is blacked out during flyback by means which have been omitted from the drawing for the sake of simplicity. Divider 15 also locks a second saw-tooth generator 17 which produces a Y time-base at a suitable multiple of the X time-base period, and feeds the Y plates 13.

The tube is operated at a beam velocity such that the ratio of secondary electrons struck out from the phosphor screen to primary electrons arriving is greater than unity. Fig. 2 shows, by the full line curve, the variation of the ratio referred to with beam velocity. It has been found that in a practical tube, there may be small patches where the phosphor screen does not cover the glass end wall, and to avoid spurious signals, the beam velocity is preferably chosen so that the secondary-to-primary ratio is also greater than unity for the glass. The dotted curve in Fig. 2 shows the variation of the secondary-to-primary ratio for the glass of the tube: thus a suitable beam velocity is one between $V_1$ and $V_2$.

The normal beam velocity is a substantially constant one, and as the beam sweeps over the screen in tracing out a rectangular raster, it leaves behind it a trail of positive charge marking each line. Information is inserted for storage by modulating the beam to cut-off by means of clock pulses from generator 14, which are allowed access to modulator 7 through a gate 18 when a negative potential is applied to terminal 19. In a system in which digital principles in the scale of two are to be stored, the digit 1 may be marked by beam cut-off (and hence a break in the positive trace) and the digit 0 may be marked by the absence of a break in the trace (that is to say, no beam modulation) during the occurrence of a clock pulse.

In Fig. 3(*a*) the digital principle 1101 (representing the scale of ten number $11=1+2^1+2^3$) had been chosen for purposes of illustration: the positive trace is shaded, and the corresponding modulator waveform is of the shape shown in Fig. 3(*h*), but is in opposite sense and of greater magnitude (evidently, there will be room in each line for a 32-digit principle, and as many principles may be stored as there are lines in the raster: the discoveries on which the invention is based are, however, fully illustrated in Fig. 3).

The charge distribution along the line of Fig. 3(*a*) is believed to be as shown in Fig. 3(*b*), in which positive charge is plotted below the datum line. As the beam sweeps over the screen, it leaves behind a trail of positive charge due to the fact that more secondaries leave than primaries arrive, and this trail is of course absent when the beam is cut off. The trail is not so positive as it would be if all the secondaries were removed by the third anode, because they are not in fact all so removed; some fall back into the trace behind the advancing beam, and leave it somewhat less positive than the potential to which it was brought by the beam. Now those parts of the trace immediately before each black-out in the scanning sequence must clearly be left more positive than the mean potential of the trace, because they do not receive secondaries during the intervals in the scan in which the beam is cut off, and thus remain substantially at the positive potential to which they were brought by the beam. There is thus formed in the trace, immediately preceding each region corresponding to beam black-out, a characteristic "well" of positive charge.

When next the beam scans the line of Fig. 3(*a*), with no negative modulating potential applied at 19, the signal appearing at the output of an amplifier 20 fed from the signal plate 11 is as shown in Fig. 3(*c*). The negative-going initial transients are caused by the beam falling on the positive wells referred to above (and it is believed that each transient begins slightly before the beam arrives at the well which produces it); the small positive transients are due to the disappearance of the primary electron cloud when the beam is switched off. Thus when the charge record of Fig. 3(*a*) is scanned, the signal due to each element of the charge pattern which was produced by blacking out the beam contains an anticipatory initial transient which gives advance notice of the fact that, in the scan in which the record was made, the beam was at a point which is being approached. In order, therefore, to regenerate the charge pattern, the gate 18 is made to open when the output of amplifier 20 contains a negative-going initial transient, to allow a clock pulse to have access to the modulator 7 to cut off the beam. To prevent spurious operations, the negative transients are selected by strobe pulses applied to gate 18 from a strobe-pulse generator 21 driven from generator 14. In Fig. 3(*c*) the small positive transients are due to the disappearance of the primary electron cloud when the beam is switched off under the control of the initial negative transient and the larger positive transients are chiefly due to the re-establishment of the positive charge trace when the effect of the negative transient ceases and the beam is again switched on.

The circuit of the gate 18 is shown in detail in Fig. 4. The output of amplifier 20 is fed, in the sense shown in Fig. 3(*c*), to terminal 23, which is connected to the control grid of a pentrode 24 through a diode 25 connected so as to be able to pass on only those parts of the input voltage variations which are negative-going. The strobe pulses, which are phased with respect to the clock pulses as shown in Fig. 3(*d*) and are negative-going with positive intervals between them, are fed in at terminal 26. The cathode of diode 25 is earthed through resistance 28, and the anode of a diode 27, to which the strobe pulses are applied, is earthed through resistances 29, 30 in series.

A condenser 31 is connected between the anode of pentode 24 and earth, and charges positively through resistance 32 when valve 24 is cut off. The anode of valve 24 is connected through resistances 33, 34, 35 to a point 36 at a negative potential of about −150 v., and the junction of resistances 33, 34 is connected to the cathode of a diode 37 whose anode is connected to the cathode of diode 25. The rising anode potential of pentode 24 is applied through condenser 38 to the grid of a valve 39 which has a resistance 40 in its cathode circuit and functions as a cathode follower.

During the positive intervals between strobe pulses, diode 27 conducts, and the control grid of pentrode 24 tends to become more positive; the anode potential of pentrode 24 accordingly falls, and diode 37 conducts, causing diode 25 to conduct and preventing further rise in grid potential. Thus the junction resistances 33 and 34 is held at a potential slightly negative relative to earth, and the junction of resistances 34 and 35 is therefore at a fixed, rather more negative potential: this is the starting level on the grid of valve 39. It is arranged that in the intervals between the strobe pulses the cathode of the diode 27 does not become more positive than the anode thereof.

If a negative pulse should appear at terminal 23 in the absence of a strobe pulse, the fact that the diode 27 is conducting prevents appreciable lowering of the potential of the grid of pentrode 24. The negative-going transients applied at 23 are at sufficient amplitude to cut off pentode 24, and when such a transient occurs during a strobe pulse, the diode 27 is insulating, the pentode 24 is cut off, and condenser 31 charges positively through resistance 32. When condenser 31 begins to charge positively, diode 37 becomes cut off, and the anode potential of pentode 24 continues to rise until the strobe pulse ends, with the result that the cathode potential of valve 39 rises as shown in Fig. 3(*f*). At the beginning of each such rise, the potential at the cathode of diode 41 is zero (earth potential) and condenser 42 charges positively.

Clock pulses are applied from point 43, through condenser 44 and resistance 45, to the grid of a pentode 46 whose cathode is connected to a point 47 at about −70 v., and whose anode is connected to the cathode of diode 41 through resistance 48. A diode 49 is connected as shown across condenser 42 and resistance 48 in series. The clock pulses cut off valve 46, which is conducting between clock pulses and has its anode held at zero volts by the flow of current in diode 49.

Thus a clock pulse which arrives when condenser 42 has been charged positively as a result of a negative transient in the input signal allows the grid of a valve 50 to go positive, and the grid remains positive until the clock pulse ends and allows the anode potential of valve 46 to become zero once more. Clock pulses which arrive when there has been no negative transient to charge condenser 42 cut off valve 46, but do not alter the potential of the grid of valve 50 from zero volts. The waveform on the grid of valve 50 is thus as shown in Fig. 3(*h*). During a clock pulse, the potential of the cathode of diode 41 falls slightly (Fig. 3(*g*)) and when the clock pulse ends, condenser 42 discharges completely through resistance 48 and value 46 before the next negative transient is due to arrive.

The operation may be summarised by saying that a clock pulse fed in at 43 is passed to valve 50 only when an anticipatory negative transient in the input has primed the gate by causing the condenser 42 to be positively charged whilst the clock pulse is operative.

Valve 50 is normally cut off, for its cathode is connected to a point at a sufficient positive potential in a potential divider 51, 52, 53. The potential at the anode of valve 50 is caught at about +80 v. between clock pulses by a diode 55 whose cathode is connected to a point at about +80 v. in potential divider 51, 52, 53. During a clock pulse, current flows in resistance 54 and the anode potential of valve 50 falls, to a value corresponding to that at which the voltage at the anode of the valve 50 is at the lowest possible value permitted by circuit conditions. There are thus fed out at point 56 square, negative-going pulses, corresponding to those of Fig. 3(*h*) but in opposite phase. These output pulses, which exactly reproduce the original modulation by which the charge pattern of Fig. 3(*a*) was produced, are applied to the modulator 7 (Fig. 1) to regenerate the pattern.

An important feature of the gate circuit of Figs. 1 and 4 is the facility to erase the stored information, by which is meant converting all charges to dots.

This is done by breaking down the regeneration loop between the pickup plate 11 and the control grid 7 of the tube 5. If this facility were not provided, on starting up the apparatus without feeding in any information there would be a tendency to produce dots, but this tendency would be over-ridden because a freshly produced dot gives rise to the positive transient in the pick-up plate and this regenerates a dash. By momentarily breaking the loop, however, this overriding is prevented and dots are stored on the screen, and after closing the loop regenerated, until information is written in requiring some of the dots to be changed to dashes.

It will be observed that a reconstituted signal is continuously available at point 56. Information may be written in at any time by making the cathode of diode 49 suitably positive for appropriate periods each embracing a clock pulse, and may be erased by any means which prevent condenser 42 from charging during a negative initial transient. Alternatively information can be written into the store, as described with reference to Fig. 1, by applying negative potentials to the gate. In this case the negative potentials are applied through terminal 19 to the cathode of diode 25 (Fig. 4), thus permitting the condenser 42 to charge and allow the pasage of a clock pulse to the valve 50. Means for achieving these two purposes have not been illustrated to avoid complexity, for their nature will be apparent to those versed in the art.

The arrangement described in detail above has been given by way of example only, and many variations within the scope of the appended claims will suggest themselves. For example, a separate insulating recording surface, other than the phosphor screen, may be provided in the tube: and, evidently, the digit 0 may be represented by a break in the trace, the digit 1 being represented by a continuous trace during a clock pulse. The clock pulse rate of 84,000 per second is an example only. It is not necessary to extinguish the beam completely to write information into the trace; similar results are had if the beam is reduced in intensity. The invention is not limited to the storage of digital information, which has been discussed as a convenient example.

In the form of the invention so far described the charge produced by the beam is varied between two different values, namely zero when the beam is switched off and some positive value when the beam is switched on.

In another arrangement according to the invention, which is particularly applicable to storage in digital computors, information is stored as a charge pattern made up of charged areas in the form of dots and dashes. In this case, therefore, although the charge produced by the beam is varied as in the previous example between zero corresponding to the spaces and some positive value during dots and dashes, the characteristic feature of the variation of which use is made in storing intelligence is a change in the form of the charge from a small charged area representing a dot and a relatively large charged area representing a dash. It can be shown that when such a pattern is re-explored by an unmodulated beam, the dots, if of suitable duration, give rise to a negative initial transient, and the dashes are characterised by a positive one. The arrangement may comprise a circuit which normally switches on the beam recurrently at predetermined intervals for the time required to write a dot, but which is operated in the present of intelligence to be stored in the form of positive-going pulses or, for the purpose of regeneration, in the presence of a positive initial transient, to draw out the trace into a dash.

A feature of the arrangement described in detail above is that information stored in any one line is only available once in each scanning of the raster. If desired, the Y time base may be made such that lines in the raster are scanned in the order 1, N, 2, N, 3, N etc. etc., where N is any line, which can be selected automatically. In such a modified arrangement, the maximum waiting time before the chosen line (N) is read is the time occupied in scanning one other line. In general, however, the invention is not limited to the use of a rectangular raster; in some applications, a single line may be stored, and in others, traces of spiral, circular and other non-rectilinear forms may be preferred. If desired, a part of the record may be set aside for storing information relating to the amplifier gain, the trace brightness or the like, and the signals derived from such a part of the trace may be caused to serve an automatic control function.

The invention may be applied not only to digital computors, but to pulse communication systems, in radar, and, in general, in any circumstances in which pulses bear information which is required to be available not only instantaneously, but over a period of time.

I claim:

1. Electrical information-storing means, comprising an evacuated envelope, an insulating, recording surface contained in said evacuated envelope with means for producing a cathode ray beam at a velocity such that, when the beam strikes the surface, the number of secondary electrons liberated is greater than the number of primary electrons arriving, means for causing the beam to explore said surface, modulating means for varying the intensity of the beam to give rise to at least two different states of charge in the form of a charge pattern on said surface corresponding to modulations characteristic of information to be recorded, signal pick-up means comprising means associated with said surface for detecting the changes in the charge on said surface, means for extracting from said pick-up means the initial transient of the signal arising in the subsequent exploration of each element of the charge pattern due to a modulation, and means for causing the extracted transients to operate said modulating means to regenerate the charge pattern.

2. Electrical information-storing means, comprising an evacuated envelope, an insulating recording surface contained in said evacuated envelope with means for producing a cathode ray beam at a velocity such that, when the beam strikes the surface, the number of secondary electrons liberated is greater than the number of primary electrons arriving, means for repetitively scanning on said surface a plurality of adjacent lines constituting a raster, modulating means for varying the intensity of the beam to give rise to at least two different states of charge in the form of a charge pattern on said surface corresponding to modulations characteristic of information to be recorded, pick-up means associated with said surface for detecting changes in the charge on said surface, means for extracting from said pick-up means the initial transient of the signal arising in the subsequent exploration of each element of the charge pattern due to a modulation, and means for causing the extracted transients to operate said modulating means to regenerate the charge pattern.

3. Electrical information storing means, comprising an evacuated envelope, an insulating recording surface, contained in said evacuated envelope with means for producing a cathode ray beam at a velocity such that when the beam strikes the surface the number of secondary electrons liberated is greater than the number of primary electrons arriving, a source of reference pulses, means operating under the control of said reference pulses to cause the beam to explore said surface, modulating means adapted to be controlled by said reference pulses for varying the intensity of the beam to give rise to a charge pattern on said surface corresponding to modulations characteristic of information to be recorded, signal pick-up means comprising a metallic plate adjacent said surface, means for extracting from said pick-up means the initial transient of the signal arising in the subsequent exploration of each element of the charge pattern due to a modulation, and means for causing the extracted transients to allow said reference pulses to operate said modulating means to regenerate the charge pattern.

4. Electrical information-storing means comprising an evacuated envelope, an insulating recording surface contained in said evacuated envelope together with means for producing a cathode ray beam at a velocity such that when the beam strikes the surface the number of secondary electrons liberated is greater than the number of primary electrons arriving, a source of reference pulses, means operating under the control of said reference pulses to cause the beam to explore said surface, modulating means adapted to be controlled by said reference pulses for varying the intensity of the beam to give rise to a charge pattern on said surface corresponding to modulations characteristic of information to be recorded, signal pick-up means responsive to variations in the charge of and associated with said surface, means for extracting from said pick-up means the initial transient of the signal arising in the subsequent exploration of each element of the charge pattern due to a modulation, a gate device fed with said reference pulses, means operated by the extracted transients for priming the gate device to allow reference pulses to pass, and means for feeding reference pulses passed by the gate circuit to said modulating means to regenerate the charge pattern.

5. Electrical information-storing means according to claim 4, comprising strobing means for extracting from said pick-up means the initial transients arising in said subsequent exploration, and for feeding the extracted transients to said means for priming the gate device.

6. Electrical information-storing means according to claim 4, comprising means for priming said gate device at times other than when one of said initial transients is present, whereby new information may be put into the store.

7. Electrical information-storing means according to claim 4, comprising means for preventing the occurrence of one of said initial transients resulting in the operation of the modulating means, whereby information may be erased from the store.

8. Electrical information-storing means, comprising an evacuated envelope, an insulating recording surface contained in said evacuated envelope with means for producing a cathode ray beam at a velocity such that, when the beam strikes the surface, the number of secondary electrons liberated is greater than the number of primary electrons arriving, means for causing the beam to repeatedly explore said surface, modulating means for intermittently interrupting the beam in response to a particular digit of a code to give rise to a charge pattern on said surface whereby the lengths of discrete parts of the charge pattern are determined by modulations characteristic of information to be recorded, signal pick-up means comprising a circuit sensitive to changes in charge on said surface, a circuit for extracting from said pick-up means the initial transient of the signal arising in the subsequent exploration of each element of the charge pattern due to a modulation, and means connected to said circuit for causing the extracted transients to operate said modulating means to regenerate the charge pattern.

9. The method of storing information electrically which includes the step of varying the intensity of the electrical charge existing along a scanning path according to variations in the signal to be stored, said step including the step of effecting secondary variations in the intensity of said charge which anticipate the primary variations, scanning said path with an electron beam and detecting the secondary variations during such scanning, and reinforcing the said charges in accordance with said detected secondary variations.

10. In a device for storing information, an evacuated envelope composed of insulating material, a thin coating of insulating material on a limited continuous portion of the inside wall of said envelope, said coating being of different composition than the envelope and both of said materials which if bombarded with electrons of velocities within a limited range of velocities the secondary electrons emitted by the materials will be greater than the primary electrons arriving, an electron gun including an anode for effecting an electron velocity at said coating that is in said range, deflecting elements for deflecting the beam emitted from said gun, a sweep generator for energizing said elements to cause the beam to scan said coating, a modulator for modulating the beam in accordance with the information to be stored, a plate of conducting material coextensive with and adjacent said coating to detect changes in the charge thereon, an output circuit connected to said plate and controlled by the changes in the charge thereon, and a regenerating circuit for affecting said modulator according to changes in said charge to reinforce said charge.

11. A device for storing information comprising a surface of insulating material, an electron gun for bombarding the surface at such a rate that the number of secondary electrons emitted by the surface exceed the primary electrons arriving, deflecting elements adjacent the beam leaving the gun to cause the beam to sweep the surface, a sweep generator for energizing the elements to effect sweeping of the surface, a modulator for modulating the beam in accordance with the information to be stored, a plate adjacent said surface for detecting changes in the charge on the surface, an output circuit connected to and controlled by the charge on said plate and responsive to changes in said charge, and a regeneration circuit connecting the output circuit to said modulator to effect regeneration of the stored charge.

12. The method of storing intelligence electrically which includes establishing a plurality of groups of elemental electrical charges which are to be stored, each of said groups having one or the other of two predetermined charge conditions, separately exposing each of said groups to an electron beam, detecting any modifications in the charges of each group due to the said exposure, and separately regenerating the charge condition of each group by varying the beam to which it is exposed in a manner depending upon the detected modifications in charges of the group due to said exposure.

13. In a device for storing information electrically, insulating means for storing charges, electron discharge means for bombarding discrete spots of said insulating means with electrons first and second times, modulating means for modulating certain of said bombardments according to information to be stored, and means responsive to changes on said insulating means in the charges due to the initial impact of the second bombardment for controlling the modulating means during the second bombardment to maintain the original charge conditions of the respective spots.

14. In a device for storing information, an electric charge storing body, electron discharge and control means comprising an electron gun for bombarding a surface of said body at such a rate that the number of secondary electrons emitted by the surface exceeds the primary electrons arriving, deflecting means for deflecting the beam leaving the gun essentially over the entire area of said surface facing said gun, means for applying voltages to said deflecting means to direct said beam recurrently to desired regions of said surface, means for modulating the beam in accordance with the information to be stored to generate on said surface a charge pattern representative of said intelligence; said pattern including spaced areas having a positive charge; pick-up means adjacent said surface for detecting changes in the positive charges on said areas and for generating voltage variations corresponding to such changes; and regenerating means connected to said pick-up means for applying said voltage variations to said first-named means to regenerate said charges.

15. A device for storing information comprising in combination, a surface for temporarily retaining electrical charges, pick-up means for detecting variations in the intensity of the charges on said surface, input means for receiving information to be stored, and control means responsive to both the pick-up means and the input means for controlling the bombardment of said surface with electrons recurrently to apply and thereafter to regenerate at least two different states of charge on said charged surface in accordance with information fed to said input means, said control means including means for suppressing regeneration during the interval that new information is fed to the input means.

16. A device for storing information as claimed in claim 15 in which the last-named means includes a single electron gun for bombarding the surface to apply charges thereto and also including modulating means controlled by both the input means and the pick-up means for controlling the intensity of the beam.

17. A device for storing information as claimed in claim 16 in which the electron gun includes means to bombard the surface at such high velocity that the secondary electrons leaving exceeded the primary electrons arriving.

18. In a device for regenerating a charge pattern having areas of positive charge produced by an electron beam striking the charged surface, the velocity of the electron beam producing said charges having had such high velocity that the secondary electrons emitted by the surface exceeded the primary electrons arriving thereat, the combinaiton with said surface, of pick-up means for detecting changes in the charges on said surface, electron discharge means for producing an electron beam of such high velocity that when it strikes said surface the number of secondary electrons emitted exceed the primary electrons arriving, means for controlling the direction of the beam to direct it at said areas in a desired sequence, modulation means for controlling the intensity of said beam, and regeneration means connected to said pick-up means and controlling the modulation means in accordance with said detected changes in charges for regenerating the charges, said regeneration means including switching means for controlling said modulation means, said switching means having first and second inputs for operating it, one of said inputs being coupled to said pick-up means.

19. The method of preserving a plurality of groups of electrical charges which includes bombarding the groups with electron beams, detecting the effect of said bombardment upon said groups, and controlling the beams according to the results of the detections to reconstitute said groups of electrical charges.

20. In an information storage system having a surface of insulation material with a charged area a limited portion of which area is more highly positive in potential than adjacent portions, the method of preserving the store of information which includes directing a beam of electrons at said limited area and then stopping bombardment of said area, said beam being concentrated upon only said limited portion for a time interval immediately prior to the cut-off of the beam, and the electrons of said beam being accelerated at such high velocity that secondary electrons emitted when the surface is bombarded exceed primary electrons arriving.

21. In an information storage system having a surface of insulation material with a charged area thereon a limited portion of which area may have higher potential than other portions, the method of preserving the store of information which includes accelerating a beam of electrons to such high velocity that when the beam strikes said surface the secondary electrons emitted exceed primary electrons arriving, directing the beam at said limited portion and concentrating the same upon such portion, detecting any change in the charges on said surface due to said beam striking said portion, and controlling the beam according to the detected changes in charges to preserve the information represented by said charged area.

22. In combination in a device for storing digital information, a surface capable of receiving electrical charges, pickup means for detecting variations in the charges on said surface, input means connected to receive information to be stored and means responsive to both the pickup means and the input means for controlling the charges received by said surface and acting recurrently to apply and thereafter to regenerate at least two different conditions of charge on said surface in accordance with information supplied to said input means.

References Cited in the file of this patent

UNITED STATES PATENTS

| | | |
|---|---|---|
| 2,219,021 | Riesz | Oct. 22, 1940 |
| 2,403,562 | Smith | July 9, 1946 |
| 2,407,000 | Evans | Sept. 3, 1946 |
| 2,430,307 | Smith | Nov. 4, 1947 |
| 2,459,319 | Hansell | Jan. 18, 1949 |
| 2,462,896 | Ransom | Mar. 1, 1949 |
| 2,468,100 | Moskowitz | Apr. 26, 1949 |
| 2,498,081 | Joel | Feb. 21, 1950 |
| 2,508,408 | Liebson | May 23, 1950 |
| 2,548,789 | Hergenrother | Apr. 10, 1951 |
| 2,617,963 | Arditi | Nov. 11, 1952 |
| 2,639,425 | Russell | May 19, 1953 |

OTHER REFERENCES

Report 562, "A Moving Target Selector Using Deflection Modulation on a Storage Mosaic," Radiation Laboratory, Massachusetts Institute of Technology, Cambridge, Mass., Unclassified May 13–17, 1946.